Patented Oct. 15, 1935

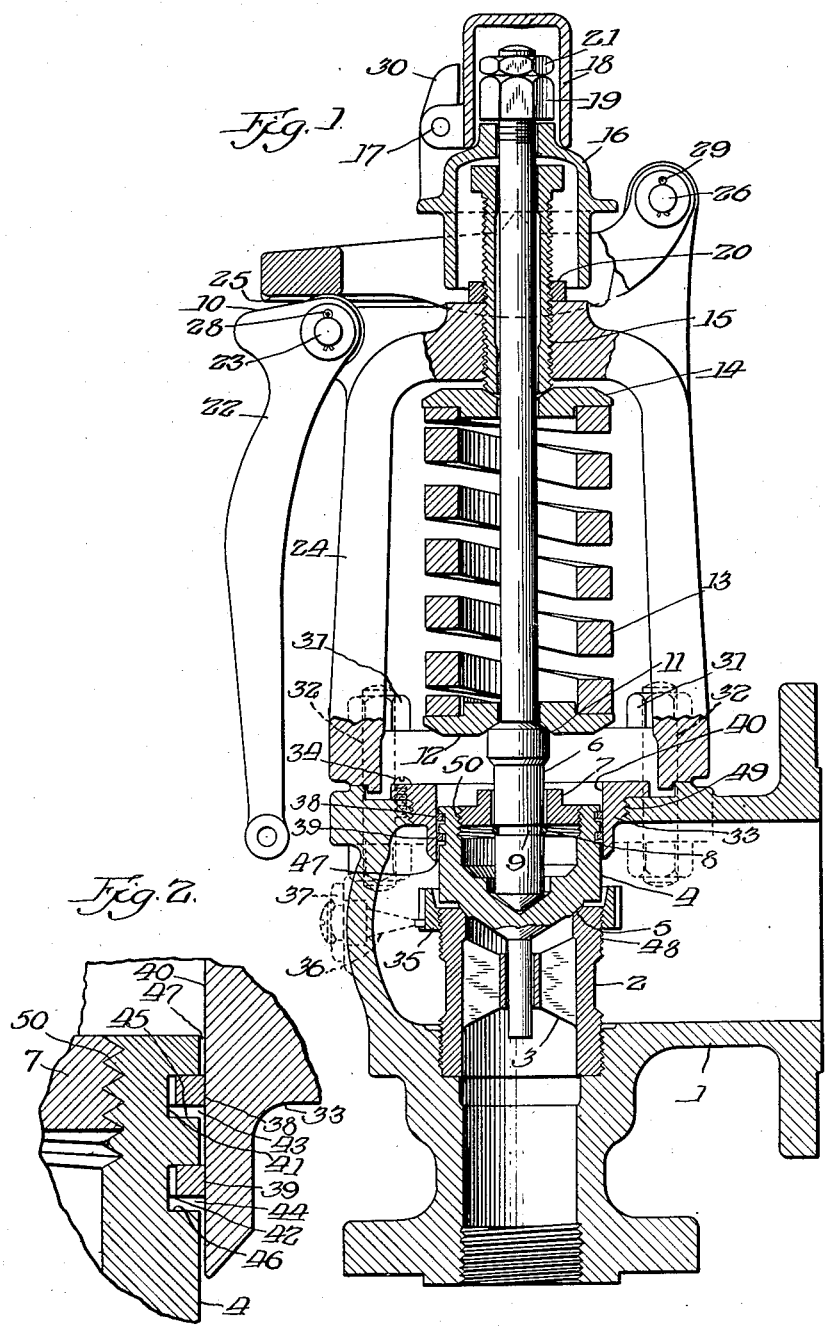

2,017,297

UNITED STATES PATENT OFFICE 2,017,297

PRESSURE ACTUATED VALVE

Alfred K. Sorensen, Chicago, Ill., assignor to Crane Co., Chicago, Ill., a corporation of Illinois Application August 25, 1933, Serial No. 686,724

3 Claims. (Cl. 137—53)

This invention relates to pop safety or relief valves and more particularly to that type of safety valve for use on high temperature liquids or gases, as for example, high temperature or superheated steam.

This invention is based upon the unique arrangement of split or snap rings loosely placed within the piston guide of the disc or valve closure member so as to allow for applying to the split rings a hammer blow or initial thrust which allows the disc to move freely before it is decelerated by the braking or dragging action normally exerted by the rings within their cylindrical guide. The braking action of the rings, of course, is produced by the friction exerted upon the cylinder wall by reason of the ring tension itself applied thereto.

Further, this invention produces a new form of disc action heretofore considered impossible in that the disc in its response to pressure acts independently of the opposition which might ordinarily be placed upon the disc because of the aforesaid ring tension. On account of the manner in which the disc or closure member is guided, the valve embodying the principle of this invention possesses the desirable feature of high lift because of the fact that there is only atmospheric pressure back of the disc, and the initial movement of the latter, both in opening and closing directions, is unimpeded by any drag or braking action by the split rings on valve closure guides.

Heretofore it has been well recognized that one of the principal problems in connection with the installation of safety valves subjected to high temperatures is the inability to obtain a valve which will be sensitive to the actuating pressure and at the same time embody a structure capable of being manufactured with sufficient practical precision to be operative without binding or introducing excessive friction in the movement of the disc proper.

One of the objects therefore, of this invention is to provide a valve which is extremely sensitive under conditions of high temperature and yet possesses substantially large clearances to avoid binding because of expansion attributable to high temperatures.

Probably more demonstrative of the advantages in the use of the construction of this invention, it is to be noted that when an ordinary safety valve of the outside spring type relieves pressure (or pops) in its customary manner, it discharges in its stead a considerable amount of steam or other line fluid around the spring, and in some cases to such an extent that the steam emitted around the spring had sufficient force to reach a ceiling, twenty feet above the valve proper.

Under identical conditions of line pressure and temperature a similar valve was installed, but employed the construction of my invention and later described herein. The amount of steam emitted around the spring could be compared to the smoke from a cigar.

In chambers of relatively limited area, as for example, the fire-room aboard a ship, it is very important to reduce escape of steam into the room to a minimum, and recognizing the desirable features of this applicant's invention, the U. S. Navy has approved of valves embodying these features for use aboard its ships and similar suitable installations.

Additional advantages of this construction will be apparent upon reading the description of a typical application of this invention to a valve as disclosed in the following:

Fig. 1 shows a sectional assembly view of one application of my invention.

Fig. 2 shows an enlarged view directed to a specific construction embodying my invention.

Referring to Fig. 1, the valve body or casing 1 is fitted with a body seat ring 2, which is provided with wing guides 3. A disc or closure member 4 seats upon the seat ring 2, forming the seat joint 5. The disc 4 is interlockably connected to the valve stem 6, by means of the disc nut 7, and the encircling locking wire 8, which fastens to the stem by means of the groove 9 thereon.

Abutting the shoulder 11 of the stem 6 is a spring washer 12 which supports a coiled spring 13, which is held in compressed relation against the spring washer 12 by means of an upper spring washer 14. Adjustment of the spring for various operating conditions is provided by means of a threaded adjusting screw 15 bearing against the upper side of the spring washer 14. In order to prevent tampering with the adjusting screw 15, a locking cap 16 rendered so by means of a padlock and hasp not shown, but fitting the opening 17, keeps the cap 18 in position. The stem is maintained in locked relation within the cap 18 by means of a threaded nut 19 and the locknut 21 therefor.

In the event that an emergency arises in which it becomes necessary to operate the valve by hand or mechanically, a lever 22 pivotally connected by the bearing 23 of the yoke 24 may be used for this purpose by raising the lever 22 and causing the cam surface 10 to engage against the underside of the horizontally disposed lever 25, which is pivoted also to the yoke at the bearing 26 and respectively locked at both yoke bearings by the cotter pins 28 and 29. The yoke member 24 is preferably held to the casing 1 by means of the nuts 31 and the studs 32. Thus by moving the lever arm 22 outwardly the cam surface creates a mechanical lifting of the entire stem assembly against the action of the spring 13.

Directing attention to the construction in the upper part of the valve casing 1, a bushing 33 is threadedly connected to the casing 1 and is placed between the yoke member 24 and the casing joint as shown in order to serve as a renewable guide for the disc or closure member, the detailed operation of which will be hereinafter described. The bushing 33 is preferably locked in position by means of the conventional machine screw 34. In order to regulate the seating conditions of the disc upon a seat ring 2, relative to the operating pressure condition an adjusting ring 35 is threadedly connected to the upper end of the seat ring 2 as shown and held in locked position by means of the machine screw 36 and the locknut 37. The ring 35 is simply the conventional means used to regulate the amount of blowback during the actuation of the valve closure member by pressure.

Directing attention more particularly to the construction shown in Fig. 2, which represents an enlargement of the disc guide means incorporating the salient feature of my invention, there is shown for example, two split type piston rings 38 and 39 respectively, annularly positioned in preferably superposed relation on the guide or piston portion of the disc 4. These rings fit relatively loosely within the grooves 41 and 42 respectively. Between the aforesaid piston portion and the bore 40 a clearance 47 is provided to insure positive free movement without binding and making substantial allowances for whatever expansion occurs because of variations in operating temperatures.

As to a typical method of operation of this device, let it be assumed for example, that line pressure is below the disc 4, which is the normal condition of installation of the valve since, as previously mentioned, the disc is held down against its seat by the spring 13. When the pressure underneath the disc is sufficiently great to overcome the action of the spring 13, the disc will be forced from its seat as at 5 and the valve will exhaust to relieve the pressure condition. However, because of the clearances shown at 43 and 44 respectively, the disc instead of being even slightly retarded in its action by reason of the friction exerted by the split rings or piston rings 38 and 39 against the wall 40 of the guide 33, the disc rises from its seat freely except for the spring action and the weight of the disc itself. Thus the inertia of the disc is immediately overcome by the line pressure without an initial braking action of the split rings which might otherwise normally be exerted in opposition to the disc action. Further, there will be an impact occurring between the clearances respectively, represented at 43 and 44, so that the lower faces 45 and 46 contact with the underside of the split rings 38 and 39, and thus exert a hammer blow action which is sufficient to cause an immediate upward movement of the rings within the upper and lower grooves 43 and 44 respectively. In the closing movement of the disc, the piston rings will lag and follow the disc to its seat, bearing against the upper surface of the grooves 43 and 44 respectively, as shown in Fig. 2.

It is thus apparent that while it is possible to maintain relatively large clearances as shown at 47, a substantially pressure tight contact within the piston rings and the internal guide is maintained by means of this particular piston ring setting. Further, I am enabled to obtain a freely moving and an extraordinarily sensitive safety valve so far as response to line pressure is concerned.

It is evident that this invention may embody many forms and I, therefore, desire to be limited to the scope of the appended claims.

I claim:—

1. In a pressure actuated valve, comprising a casing, a reciprocably movable closure member therefor guided within a cylindrical bore within said casing, transverse grooves circumferentially disposed upon said closure member, snap rings positioned within said grooves, the said rings exerting substantially uniform radial outward pressure on the circumferentially curved surface of said bore, the inner diameter of said rings being greater than the inner diameter of the said grooves, the width of said rings being substantially less than the width of the grooves in which they are disposed, whereby the valve closure member is initially movable in its opening movement without the frictional resistance of the said snap rings.

2. In a pressure actuated valve, comprising a casing, a reciprocably movable closure member therefor loosely guided within a cylindrical bore within said casing, transverse grooves circumferentially disposed upon said closure member, snap rings positioned within said grooves exerting substantially uniform radial outward pressure on the circumferentially curved surface of said bore, the inner diameter of said rings being greater than the inner diameter of the said grooves, the width of said rings being substantially less than the width of the grooves in which they are disposed, whereby said dimensional differences between the grooves and the said rings permit an initial impact upon said snap rings when the said closure member is actuated by line pressure.

3. In a pressure actuated valve, comprising a casing, a guide within said casing, a closure member therefor movable within said guide and having transverse grooves circumferentially disposed thereon, snap rings positioned within said grooves, the said rings exerting substantially uniform radial outward pressure on the circumferentially curved surface of said bore, the inner diameter of said rings being greater than the inner diameter of the said grooves, the width of said rings being substantially less than the width of the grooves in which they are disposed, whereby the said closure member in leaving its seat within said casing and subsequent returning thereto is momentarily free of the frictional resistance normally extant between said rings and said bore.

ALFRED K. SORENSEN.